United States Patent [19]

Welk et al.

[11] Patent Number: 5,173,999
[45] Date of Patent: Dec. 29, 1992

[54] HOLDER FOR CLOSED END WRENCHES OR SIMILAR ARTICLES

[76] Inventors: Stephen G. Welk, 620 W. 7th, #307, Spokane, Wash. 99204; Brian J. Hoerner, 1511 S. Adams St., Spokane, Wash. 99203

[21] Appl. No.: 631,663

[22] Filed: Dec. 20, 1990

[51] Int. Cl.⁵ ............................................. A44B 13/00
[52] U.S. Cl. .................................. 24/599.2; 24/599.7; 24/600.9; 206/376
[58] Field of Search ................ 24/599.2, 599.6, 599.7, 24/600.9, 601.2, 601.3, 573.5; 59/85, 89; 70/456 R, 458, 459; 206/372, 376, 378

[56] References Cited

U.S. PATENT DOCUMENTS

| | | | |
|---|---|---|---|
| 167,399 | 9/1875 | Goodrich | 24/601.3 |
| D. 178,482 | 8/1956 | Bacon . | |
| D. 178,484 | 8/1956 | Bacon . | |
| 271,121 | 1/1883 | Riley et al. . | |
| 606,997 | 7/1898 | Mehl | 59/89 |
| 764,909 | 7/1904 | Bartlett | 24/600.9 |
| 810,081 | 1/1906 | Piper | 70/456 R |
| 959,836 | 5/1910 | Beer . | |
| 1,386,894 | 8/1921 | Myrmo | 24/599.2 |
| 1,610,985 | 12/1926 | Vea | 70/459 X |
| 2,270,306 | 10/1955 | Zubricky . | |
| 2,551,564 | 5/1951 | Marien . | |
| 2,747,730 | 5/1956 | Zubricky . | |
| 2,871,540 | 2/1959 | Smith | 24/601.3 X |
| 2,871,691 | 2/1959 | Bacon . | |
| 3,745,800 | 7/1973 | Zentmyer | 70/458 |
| 3,777,523 | 12/1973 | Holland | 70/456 R |
| 4,333,212 | 6/1982 | Bibollet | 24/599.6 |
| 4,497,405 | 2/1985 | Mikic et al. | 206/378 |

FOREIGN PATENT DOCUMENTS

| | | | |
|---|---|---|---|
| 65527 | 11/1892 | Fed. Rep. of Germany | 24/600.9 |
| 2626748 | 12/1977 | Fed. Rep. of Germany | 24/600.9 |
| 422235 | 3/1911 | France | 24/599.2 |
| 52498 | 8/1922 | Sweden | 24/599.2 |

*Primary Examiner*—James R. Brittain
*Attorney, Agent, or Firm*—Wells, St. John, Roberts, Gregory & Matkin

[57] ABSTRACT

A device 10 is described for portably supporting a group of wrenches 11 or similar articles and for selective operation to receive or release selective ones of the wrenches 11 on a clip wire loop 19. The clip wire loop 19 extends from a rigid handle 18 to ends 20, 21 providing a latch arrangement 23 that will open responsive to force applied thereto by a wrench end 13 and thereby allow the wrench 11 to be easily and quickly mounted to or removed from the clip wire 19. Particular angular orientations and spacing of side surfaces of the latch 23 form a "v" notch 40 that facilitates operation of the latch 23 to open responsive to forcible contact by the wrench end 13. Two preferred forms of the device 10 are described. The first includes a preferred latch 23 having a pivoted, spring biased latch arm 26. The second preferred from includes the latch 23 as an integral portion of the clip wire 19. In the first preferred form, a spring and push rod are mounted to the clip wire and operate against the latch arm to urge the arm continuously toward a closed condition. A circular notch in the latch arm slidably receives the push rod to enable smooth pivotal motion of the latch arm through an arc of 90° about a pivot axis of the latch arm.

26 Claims, 7 Drawing Sheets

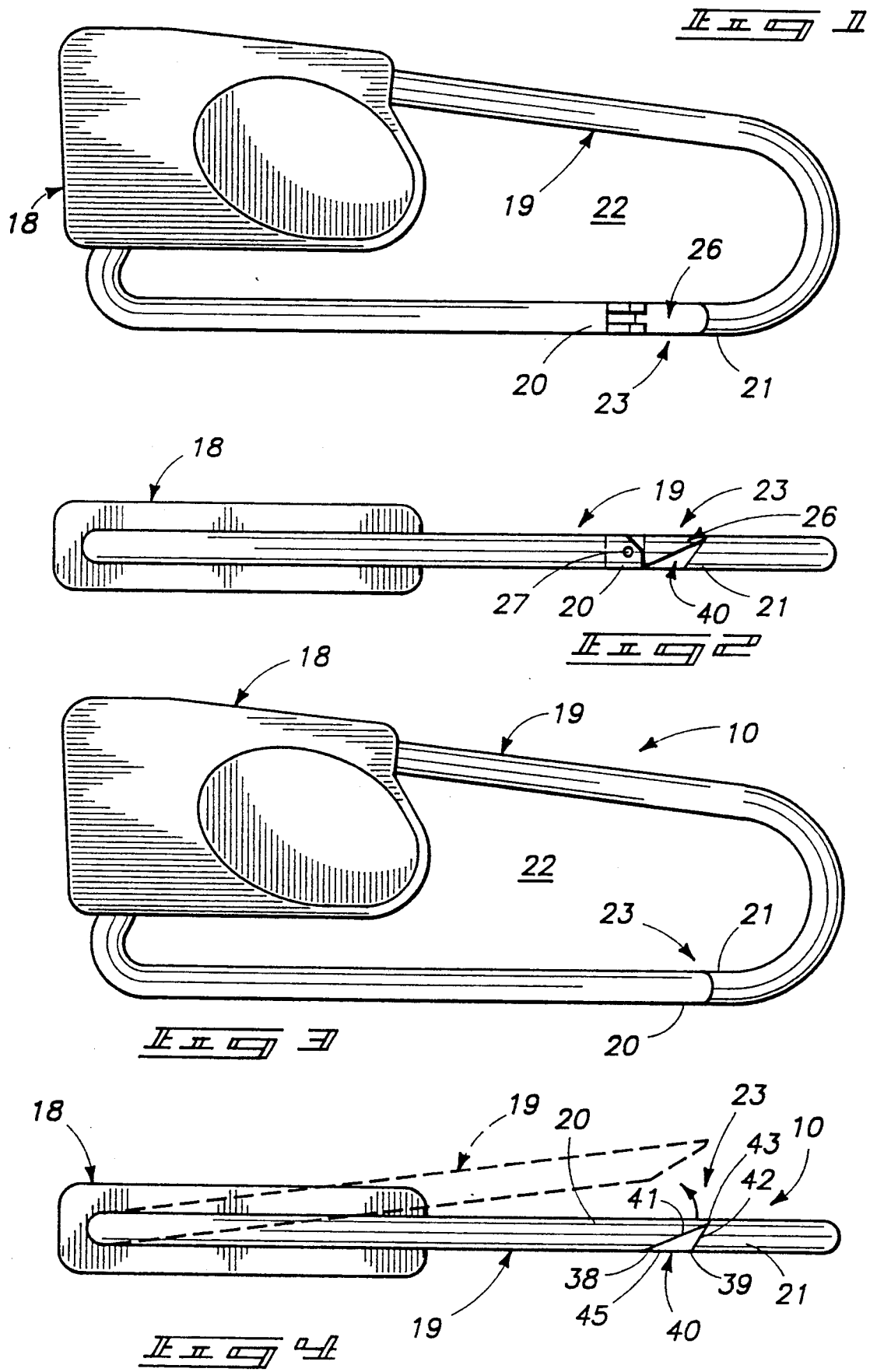

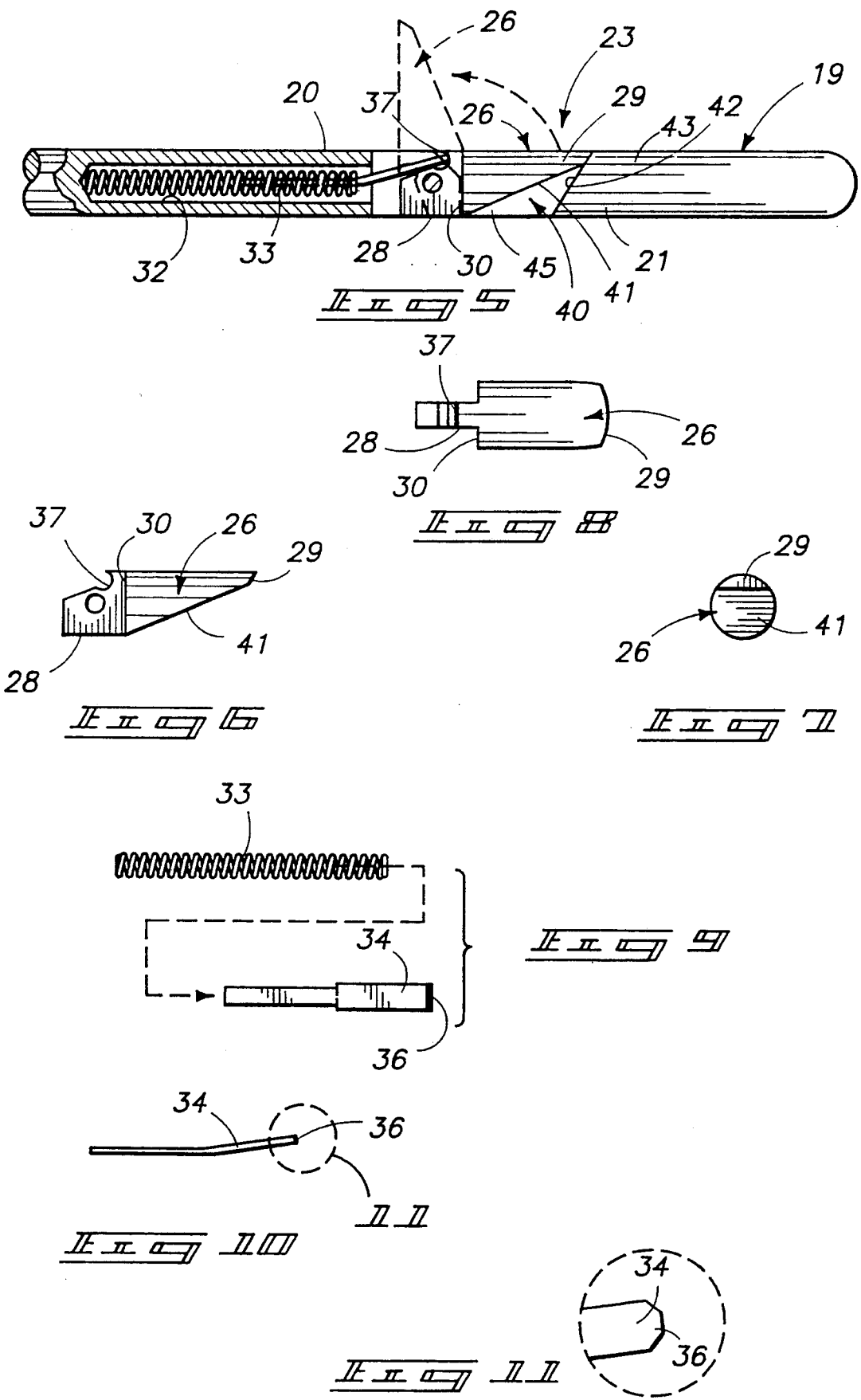

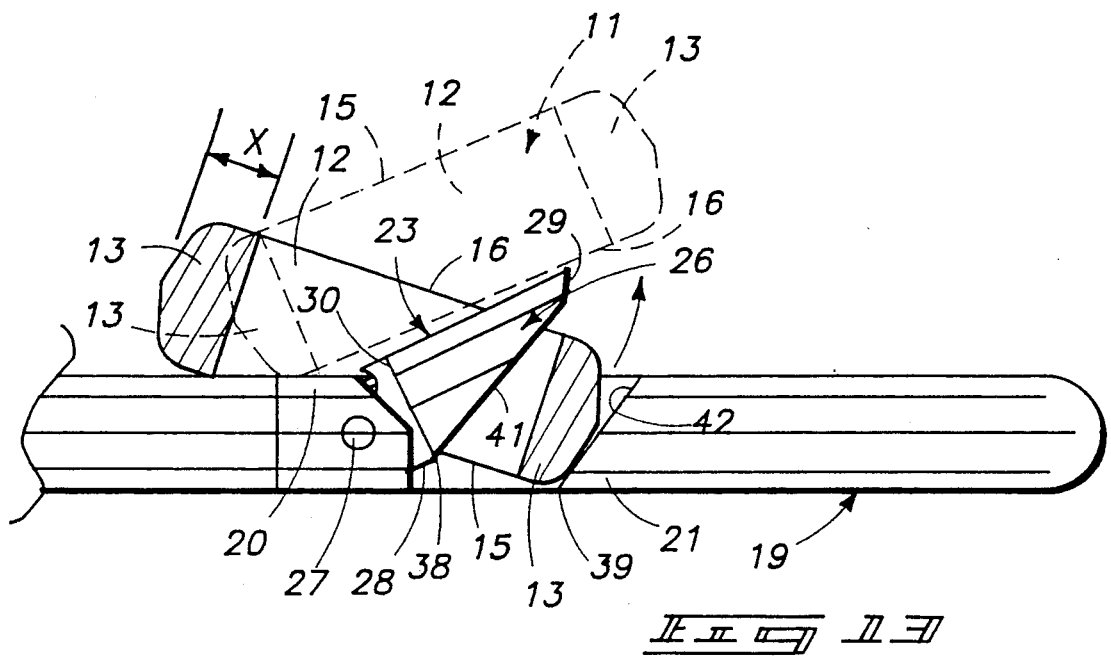
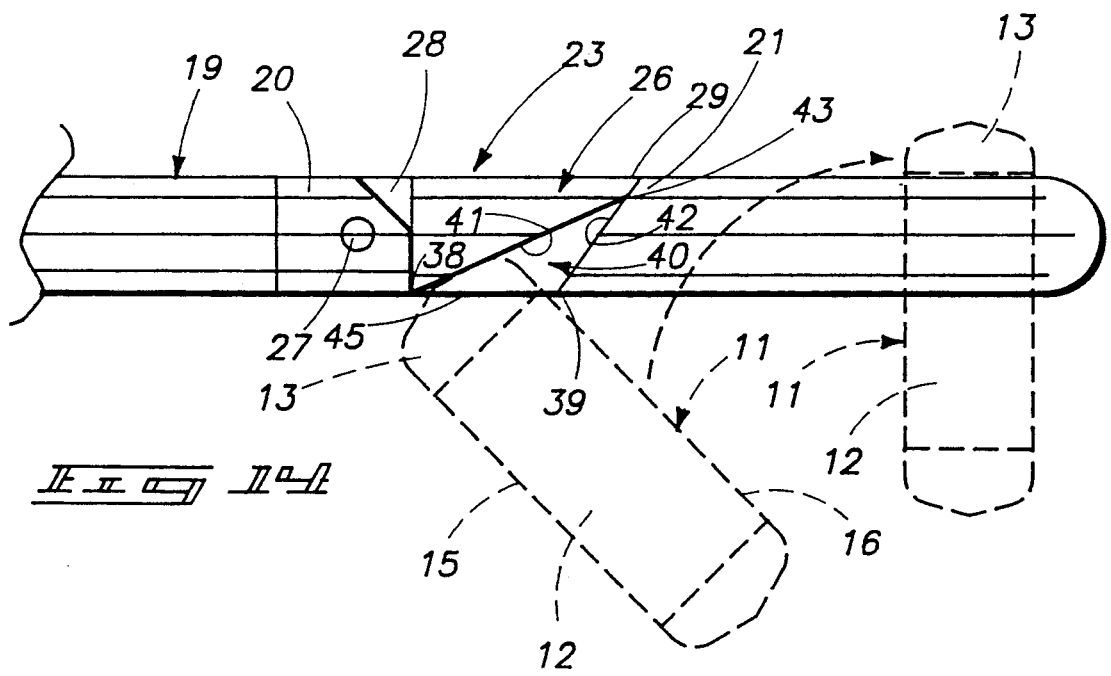

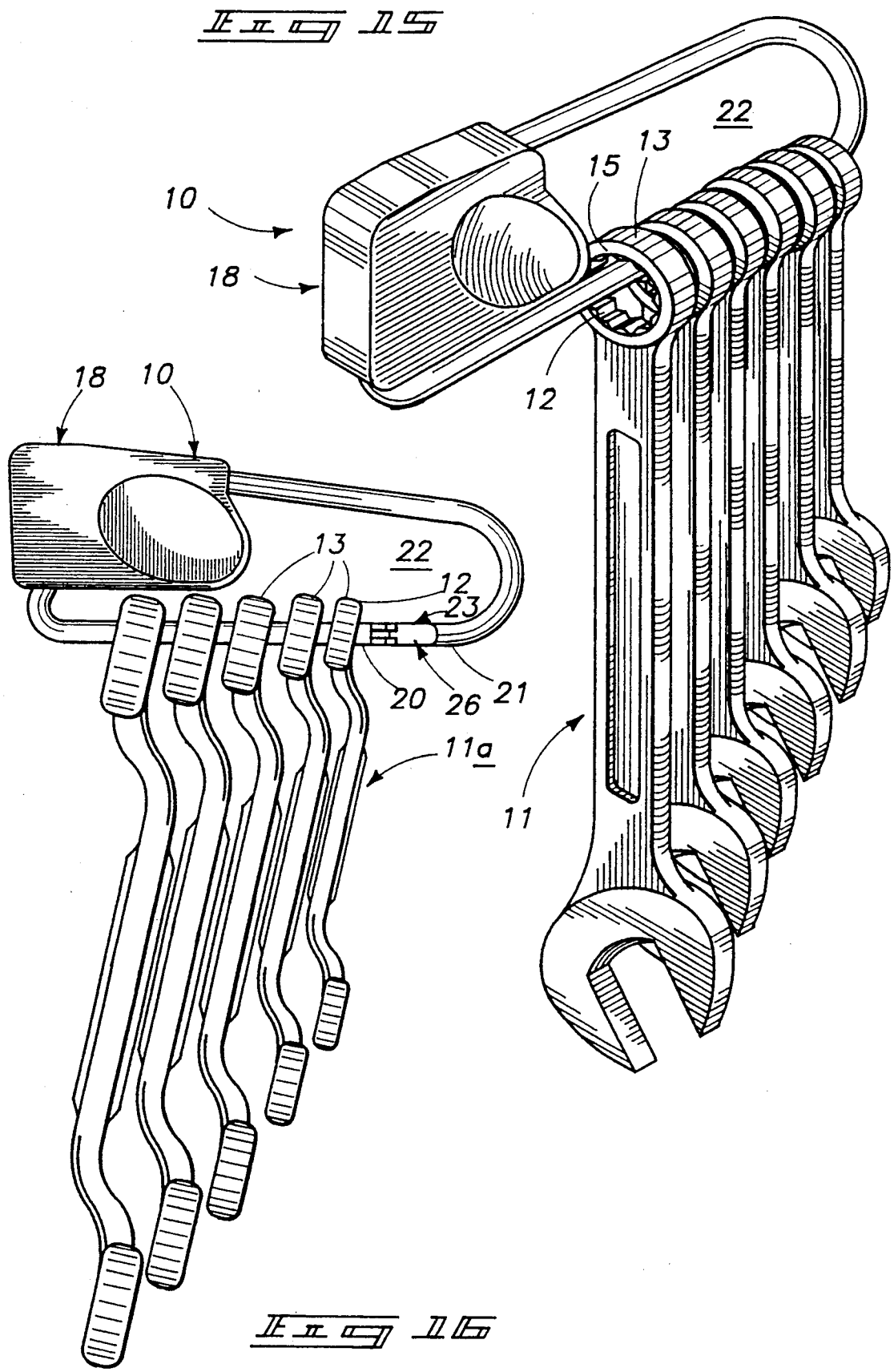

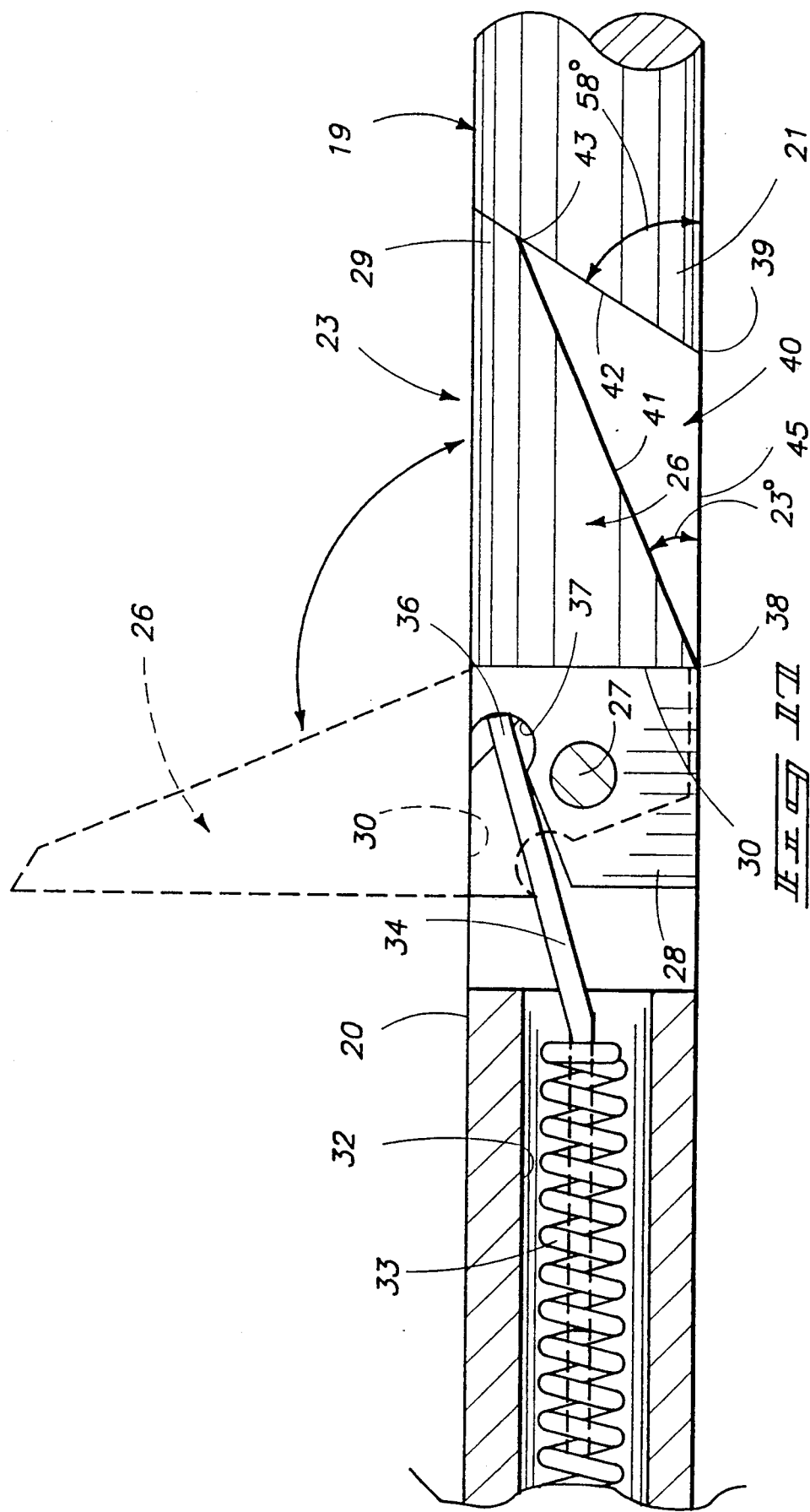

HOLDER FOR CLOSED END WRENCHES OR SIMILAR ARTICLES

TECHNICAL FIELD

The present invention relates to portable, releasable storage for wrenches and like articles.

BACKGROUND OF THE INVENTION

Wrench sets have a reputation of being impractical to transport and use as a set. Storage packages designed to provide consolidation of the tools are often impractical for actual use as a portable storage device for the collection of tools. Selection of individual tools from the group is hampered by the usual form of packaging. Current storage has been confined primarily to minimizing storage space for the tools, rather than facilitating selection of the tool or individual tools from the group while maintaining the remaining tools in the group in a desired order.

A typical user solution to the access problem is to mount the group of tools on, say, a perforated "peg board". This is a very effective and neat way to store tool sets, but does not afford the ability to transport the tools as a group to the work site in any orderly and accessible manner.

Roll-up cases formed of plastic or fabric with individual pockets are provided. The packaging must be undone and rolled out each time a tool is needed. The package must later be rolled back up for storage. This form of storage device is often temporary due to the use of closed pockets for the individual tools. The pockets will eventually become torn, dirty and greasy, thereby hampering the ability to shift the package from the rolled, storage condition to the unrolled access condition.

Often sets of wrenches will be sold with a metal clip used to hold the wrenches in an organized stack. Such metal clips and associated clamps allow an orderly presentation of the several wrenches within a set. Where they fail is in facilitating quick and easy addition and removal of individual wrenches to and from the stack. The clips are therefor used primarily for extended storage purposes.

Examples of clip arrangements for releasably holding wrenches in stack arrays are shown in U.S. Pat. Nos. 2,720,306 and 2,747,730. Both of these references function well to maintain an orderly stack of wrenches but do not present the wrenches in such a manner that any one wrench may be easily and quickly added to or removed from the stack.

Another approach to the above problem has been answered by simply packaging assorted wrenches loosely in a pouch. This approach is substantially simpler than the clip and multiple pouch arrangements. But the wrenches are loose within the pouch and thus any single wrench becomes difficult to find. The pouch type holder becomes quickly oversized when more than one or two wrenches are removed from the pouch. The remaining wrenches become loose within the pouch and may be easily spilled, resulting in loose wrenches throughout the user's toolbox or the adjacent area.

The present releasable portable storage device is presented as a solution to solve the problem of successfully storing closed end wrenches, or similar articles having end openings, in an organized manner for easy portability, that maintains the articles for quick and easy removal from the device, and that facilitates quick and simple mounting of articles to the device.

BRIEF DESCRIPTION OF THE DRAWINGS

Preferred forms of the present invention are illustrated in the accompanying drawings, in which:

FIG. 1 is a top plan view exemplifying a first preferred form of the present invention;

FIG. 2 is a front elevation view thereof;

FIG. 3 is a top plan view exemplifying a second preferred form of the present invention;

FIG. 4 is a front elevation view of the second preferred form;

FIG. 5 is an enlarged fragmentary view of a latch means for the first preferred form of the present device;

FIG. 6 is a front elevation view of a latch arm;

FIG. 7 is an end view of the latch arm;

FIG. 8 is a top plan view of the latch arm;

FIG. 9 is an exploded view of a spring and push rod arrangement for the latch arm;

FIG. 10 is a front side view of the push rod;

FIG. 11 is an enlarged view of the area circled by dashed lines in FIG. 10;

FIG. 13 is a fragmented operational view showing progressive removal of an article such as a wrench through the latch means of the first preferred form of the device;

FIG. 14 is a fragmented operational view showing progressive attachment of an article such as a wrench through the latch means of the first preferred form of the device;

FIG. 15 is a perspective view of the present device with a set of combination wrenches mounted thereto;

FIG. 16 is a view of the device with a set of closed end wrenches mounted thereto;

FIG. 17 is an enlarged fragmented view of the latch means for the first preferred device.

DETAILED DESCRIPTION OF THE PREFERRED EMBODIMENTS

Figure 12:
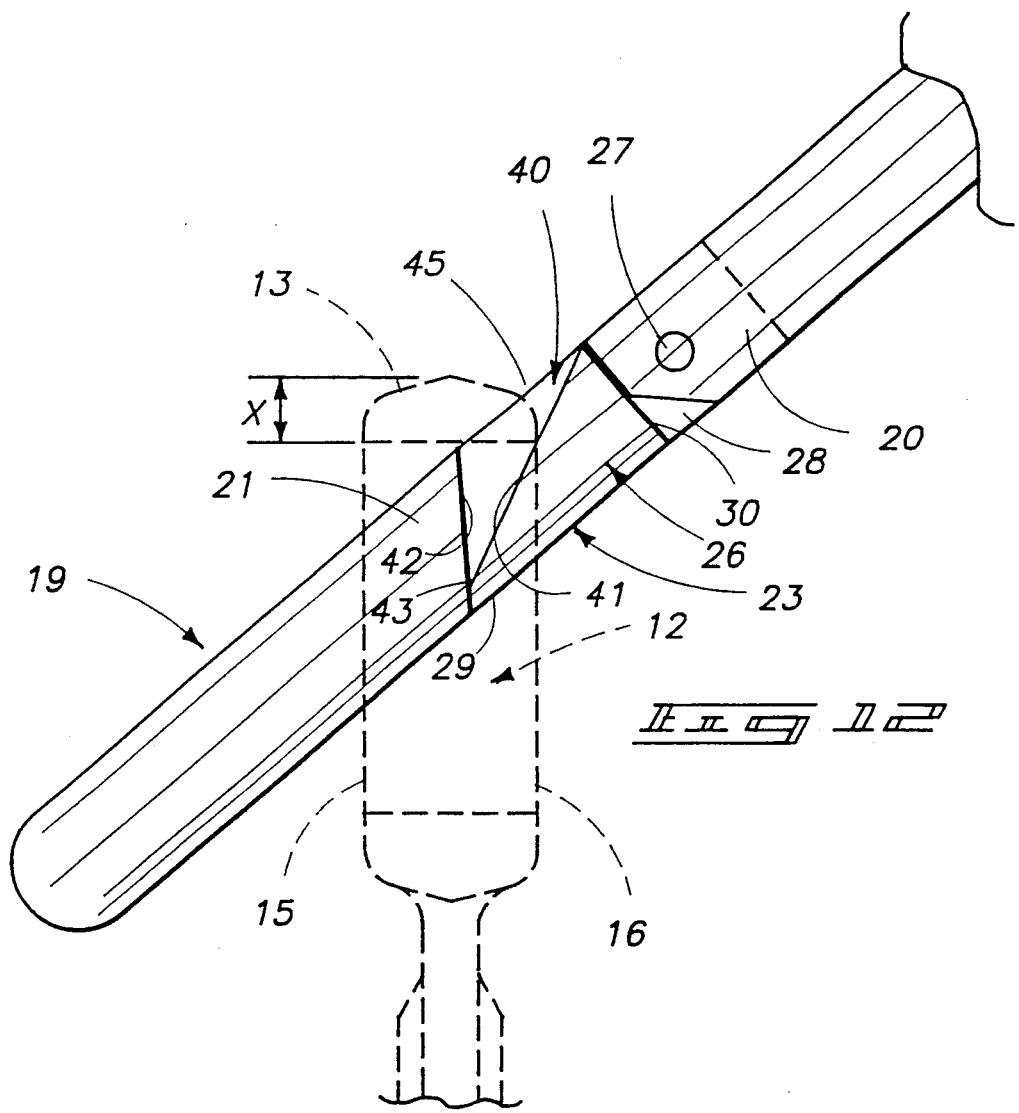
FIG. 12 is a fragmented operational view with a wrench shown in dashed lines hanging on the clip wire of the present device.

The following disclosure of the invention is submitted in furtherance with the constitutional purpose of the Patent Laws "to promote the progress of science and useful arts" (Article 1, Section 8).

There are two basic forms of the present invention shown generally by the reference numeral 10 in the drawings. The first preferred form of the invention is shown generally in FIGS. 1, 2, and others of the drawing figures, and a second preferred form is shown in FIGS. 3 and 4.

For purposes of brevity in this disclosure, like elements of the two preferred forms of the invention will be referred to with like reference numerals. Also unless otherwise specified, description of one form will serve as description of the other.

Both forms of the present device 10 are provided with specific features for releasably storing a number of combination wrenches 11 (FIG. 15), closed end wrenches 11a (FIG. 16) or other similar articles.

Before proceeding further with the description of this invention, a definition will be given broadening the definition of the term "closed end wrench" or simply "wrench". It will become obvious that the present invention will function with a good number of tools or other articles. Therefore, the term "closed end wrench" or "wrench" when used herein, should be understood to take in any number of other articles, as with wrenches which include an open socket 12 at an end 13. The open socket 12 is formed with a thickness dimension "X" at the article end 13 and between opposed edge surfaces 15, 16. Socket 12 may be simply a bore or hole formed through an end of, say, a handle.

In general terms, both forms of the present device 10 include a handle 18. The handle may be formed of any appropriate material but is advantageously a molded or cast plastic. The preferred handle is substantially flat and has an indentation on one surface to accommodate a user's thumb.

Figure 18:
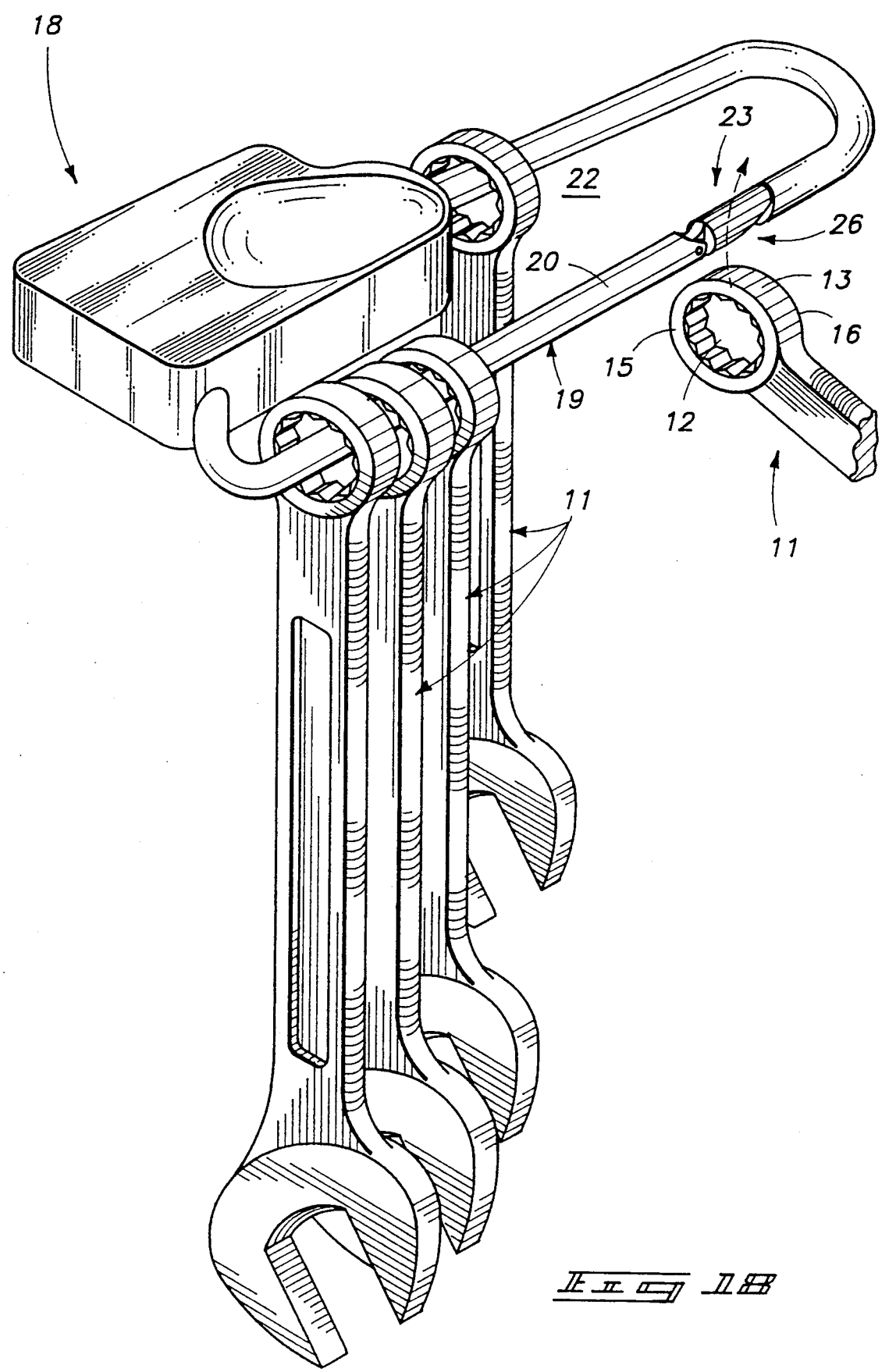
FIG. 18 is a perspective view showing a set of wrenches on the first preferred form of the present device and showing attachment of a wrench thereto.

A clip wire 19 is attached to the handle 18. The preferred clip wire 19 is formed of a high strength, resilient and durable material such as alloy steel. The clip wire 19 extends in a loop 22 configuration outwardly from the handle 18, advantageously in a plane parallel to that of the flat handle 18. It includes at least one straight section projecting from the handle. The straight sections of the clip wire 19 will serve to hold wrenches in relatively parallel orientation (see FIGS. 15, 16 and 18) therefore facilitating their storage and transport. A circular or curved clip wire 19 would cause the wrenches to "fan" apart and significantly increase the bulk of the collection.

The clip wire loop 22 is broken at first and second adjacent ends 20, 21 approximately midway along that part of the clip wire 19 extending from the handle. The ends 20, 21 are also preferably situated between straight sections of the clip wire 19.

A latch means 23 is provided at the clip wire ends 20, 21. The latch means 23 is responsive to forcible engagement with a wrench 11 to shift to an open position (see dashed lines in FIGS. 4, 5, and 17) and thereby form an opening of sufficient size to facilitate selective reception of the open socket of the engaged wrench over the clip wire 19 and onto or off from the clip wire loop 22.

The latch means 23 is normally oriented in a closed position wherein the latch means 23 and clip wire 19 are substantially continuous about the loop 22.

It may be noted that the latch means 23 is provided in two alternate embodiments. A preferred form of latch means is shown in FIGS. 2 and 5-13 including a pivoted latch arm 26. Alternatively, in the second preferred form the latch means 23 may be provided as an integral part of the clip wire 19 as shown in FIGS. 3 and 4. In the latter alternative, the latch means 23 will move to the open position along with the adjacent integral portion of the clip wire 19 as shown by dashed lines in FIG. 4 to facilitate addition and removal of tools from the device.

The preferred latch arm 26 is mounted by a pivot pin 27 to the clip wire 19. Pivot pin 27 extends through the latch arm and clip wire, mounting the latch arm 26 coextensively with the clip wire 19 such that the latch arm effectively becomes the first clip wire end 20.

The pivot axis of the latch arm 26 is defined by the axis of the pivot pin 27. It is advantageous to orient the pivot axis of pin 27 substantially parallel to a plane including at least a portion of the clip wire loop 2. Preferably, the entire loop 22 is formed in such a plane.

An end 28 of the arm 26 mounts the pivot pin 27. A remote end 29 of latch arm 26 normally rests against the second end 21 of the clip wire 19. This is the normal closed position for the latch arm 26.

Latch arm end 29 abuts with the second clip wire end 21 in the closed position and thereby prevents the latch arm 26 from pivoting beyond a preferred condition where the top or upper surface of the latch arm 26 as viewed in FIG. 2 is substantially continuous with the remainder of the clip wire 19.

In the first preferred form, the clip wire 19 includes a bore 32 (FIGS. 5, 17) for loosely receiving a compression spring 33. A push rod 34 is received within an outward end of the compression spring. A forward end 36 (FIGS. 11, 17) of the push rod 34 is releasably and slidably received within a circular notch 37 formed in the latch arm 26. The spring 33 and push rod 34 will normally urge the latch arm 26 toward the closed position and will yieldably resist movement of the latch arm 26 to its open condition.

A unique radial push rod notch 37 lows the latch arm 26 to swing approximately 90° about the pivot pin 27 to a fully open position as indicated in FIGS. 4, 5, and 17. The latch arm 26 includes shoulder surfaces 30 (FIGS. 8, 17) that will abut the clip wire at the 90° position and will not permit further pivotal movement.

The arrangement of push rod 34, spring 33 and circular notch 37 are features important to proper functioning of the present invention. The arrangement of these elements, as shown in FIG. 17, allow the latch arm to be pivoted a full 90° while allowing the spring to exert a smooth, even resistance force on the latch arm for every given position between fully closed and fully open. The spring urges the push rod end (see detail of rod end 36 in FIG. 11) against the circular surface of the notch 37 to accomplish this function. The push rod end rides within the notch 37 and slides freely over its circular surface. The push rod is therefore always free to push against the latch arm in a straight line without any interference through the theoretical center of the notch 37, regardless of the latch arm angle. This allows the push rod end 36 to naturally stay in the notch 37 for any angle of latch arm rotation while transmitting the spring force to the latch arm at a point radially outward of the pivot pin 27, thereby urging the latch arm toward the closed position. With the above particular relationship there is no danger that the latch arm will pivot to a position where the push rod will slip from engagement with the notch 37 throughout the entire angular pivotal range of the latch arm 26.

Another important feature of the present invention is a "v" notch 40 that is formed by the latch means 23 to receive and guide the end of a wrench 11 onto or off from the clip wire 19.

The "v" notch 40 is comprised of a latch surface 41 and a guide surface 42. The latch surface 41 is preferably formed on the latch arm 26 of the first preferred form. The surface 41 faces angularly away from the direction of pivotal movement for the latch arm 26.

In the second preferred form of the present device 10, the latch surface 41 is formed at the first end 20, integrally with the clip wire 19.

The "v" notch also includes a guide surface 42 preferably formed on the second clip wire ends 21 of both preferred forms of the present device. Surfaces 41, 42 normally converge from base ends 38, 39 which are spaced apart to form a base opening 45. Surfaces 41, 42 meet at an apex 43 part way through the thickness or diameter of the clip wire 19.

The converging surfaces 41, 42 form an acute angle with one another. They also form sides of an oblique triangle (FIG. 17) with the opening 45 between the base ends 38 and 39 as the triangle base. The oblique triangle thus includes the base opening 45 as the triangle base side, and the latch and guide surfaces 41 and 42 as the obliquely inclined sides. The angles at which the surfaces 41, 42 are formed is such that the latch surface 41 overlaps the guide surface 42 in relation to the plane of the clip wire loop 22 at the latch means 23.

Angles of the latch surface 41 and guide surface 42 are approximately 23° and 58°, (FIG. 17) respectively from the plane of the wire loop 22 at the latch means 23.

The preferred base opening 45 of the "v" notch 40 (between surface ends 38, 39) is equal to or slightly greater than the corresponding thickness dimension X (FIGS. 12 and 13) of a wrench 11. The wrench thickness dimension "X" is to be considered as that of the largest wrench of any group of wrenches 11 intended to be held by the present device 10. For example, if the largest wrench in a group includes a thickness dimension "X" at its socket end 13 of, say, of 0.75 centimeters, then the distance between surface ends 38, 39 will be at least 0.75 centimeters or slightly greater.

The base opening 45 so sized facilitates reception of the socket end of the largest wrench and enables ease in attachment to and removal of that particular wrench to the present device 10. All the smaller wrenches in the set to be held will also be as easily received and released.

The above combination of features facilitates fast and easy removal of wrenches from the device and similarly facilitates mounting of the same wrenches to the clip wire 19. Both surfaces 41, 42 function to guide the wrenches 11 onto and off from the clip wire.

In operation to remove a wrench, a user may simply angularly orient the selected wrench presently on the clip wire 19 in the orientation of the latch surface 41 and slide the wrench onto the surface 41. This movement is progressively shown in FIG. 13. The wrench will be received by the "v" notch 40 and will come into sliding abutment with the inclined guide surface 42. Surface 42 will then act to simply guide the wrench up and off from the latch.

In the first preferred form, the latch arm 26 will swing upwardly under resistance of the spring 33. The spring 33 and push rod 34 will snap the latch arm 26 closed once the wrench 11 is removed.

In the second preferred form (FIG. 4) the same procedure takes place except that a section of the clip wire will spring upwardly in response to force applied by the wrench substantially to the position shown by dashed lines in FIG. 4 to allow the wrench to pass through the latch means 23. The resilient clip wire will then snap the latch surfaces 41, 42 closed once the wrench is removed.

Similarly, a wrench may be placed on the clip wire 19 by simply urging the wrench end against the guide surface and pressing the wrench against that surface while forcing the latch simultaneously open.

In the first preferred form, the latch arm will swing open and the wrench will slide almost effortlessly onto the clip wire. The spring will cause the latch arm to again snap closed once the wrench is safely on the clip wire loop 22.

In the second preferred form, the adjacent section of the clip wire 19 will again spring open (FIG. 4) responsive to the force applied to the wrench 11. The wrench will then slide easily onto the clip wire 19. The natural resiliency of the clip wire 19 will cause the latch means to snap closed once the wrench is safely on the clip wire loop 22.

FIG. 12 illustrates another feature of the present device that is common to the first and second forms of the present device, particularly in relation to the "v" notch 40. The particular geometry of the "v" notch 40 is arranged such that a wrench 11 will not easily be unintentionally removed from the clip wire 19 and latch means 23.

FIG. 12 shows a wrench 11 hanging from the clip wire 19 with a flat surface of its socket opening 12 resting against the bottom or base end 39 of guide surface 42. The point of engagement between the wrench socket and the base end 39 is such that the weight of the wrench rests primarily against clip wire 19 and is not applied against the latch surfaces 41 or 42 to push the latch means 23 open.

Thus, wrenches may be slid along the length of the clip wire 19 without fear that one will accidentally slip through the latch means.

Another feature of the "v" notch configuration 40 is realized when a number of wrenches 11 are mounted to the clip wire 19. A situation will often arise when a single wrench 11 is to be removed from or added to the midst of a group already on the clip wire 19. The selected wrench 11 may be moved to a position adjacent the latch with the remaining wrenches on both sides of the selected wrench. This allows the selected wrench to be easily moved through the latch means without requiring the other wrenches to be first removed from the clip wire 19.

The user may simply move the wrenches along ahead of the selected wrench by simply grasping the selected wrench and moving it toward the latch means 23. The selected wrench will push the remaining wrenches along past the "v" notch. Then, when the selected wrench is started into the "v" notch 40, the engaged adjacent wrench will be moved along the clip arm, clearing the latch means 23.

In actual practice, the selected wrench or even a small number of selected wrenches may be simultaneously removed from or added to the clip wire. The features described above facilitate this procedure at such speeds that the latch member movement may become nearly invisible.

The speed at which the wrenches are removed from and attached to the clip wire 19 is also a function of the position of the latch movement in relation to the plane of the clip wire. The latch means, unlike many latches found on snap rings and the like, provides for the surface 41 to swing out of the plane of the loop 22. Thus the device 10 may be held with the loop horizontal and with the wrenches mounted thereon hanging vertically downward from the clip wire. The wrenches will therefore easily slide along the clip wire as one of the group is taken from the clip wire or is added thereto.

Further with the present latch orientation and geometry, the entire attachment and removal procedure is facilitated simply by engaging the latch with the wrench itself, rather than requiring manual manipulation of a latch as required in many snap ring arrangements.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

We claim:

1. A wrench storage device for releasably supporting a wrench or similar article having an open socket formed at an end along an axis through a thickness dimension, the storage device comprising:

a handle;

a clip wire having a prescribed cross sectional configuration formed along an axis, the clip wire being affixed to the handle and formed into a loop of a continuous configuration extending from the handle;

the clip wire including ends spaced adjacent one another within the loop along the loop and outward of the handle;

a latch means on the clip wire at the ends thereof and confined in a normally closed condition within the loop such that the continuous configuration of the loop is uninterrupted, the latch means including a "v" notch formed into the loop configuration by the ends of the clip wire, with an open end of "v" notch being axially spaced from the open end of the "v" notch and also within the loop, the latch means being responsive to selective forcible engagement by the open socket end of the wrench or similar article to move to an open position forming an opening in the loop and guiding the open socket of the engaged wrench or similar artice over the clip wire onto or off from the loop, from the normally closed position wherein the latch means and clip wire are substantially continuous, forming the loop of continuous configuration.

2. The storage device as set forth by claim 1 wherein the latch means is comprised of:

a latch arm;

a pivot pin pivotably mounting the latch arm to the clip wire at one end thereof; and a spring biased push rod mounted between the clip wire and latch arm for releasably biasing the latch arm to the closed position.

3. The storage device as set forth by claim 1 wherein the latch means is comprised of:

a latch arm;

a pivot pin pivotably mounting the latch arm to the clip wire at one end thereof; and a spring biased push rod mounted to the clip wire and engaging the latch arm to yieldably bias the latch arm to the closed position.

4. The storage device as set forth by claim 1 wherein the latch means includes:

a latch arm piovotably mounted to the clip wire at one end thereof by a pivot pin, for pivotal movement to an open position approximately 90° from the clip wire.

5. The storage device as set forth by claim 1 wherein the clip wire loop is formed in a plane and wherein the latch means includes:

a latch arm pivotably mounted to the clip wire at one end thereof by a pivot pin, for pivotal movement about an axis parallel to the plane of the loop to an open position at approximately 90° from the plane;

the latch arm including a circular notch formed therein and radially spaced from the axis of the pivot pin;

a compression spring mounted to the clip wire; and a push rod mounted to the compression spring and having an end slidably engaging the circular notch, for urging the latch arm to the closed position.

6. The storage device as set forth by claim 1 wherein the clip wire loop is formed in a plane and wherein the latch means includes:

angularly oriented latch and guide surfaces together forming the "v" notch in the clip wire;

wherein the latch surface and guide surface are oriented at approximately 23° and 58° angles, respectively from the plane of the clip wire loop.

7. The storage device as set forth by claim 1 wherein the clip wire and latch means are integral.

8. The storage device as set forth by claim 1 wherein the latch means includes "v" notch surfaces formed by converging clip wire guide and latch surfaces, the clip wire guide and latch surfaces forming an acute angle with the apex of the "v" notch being at joined ends of the guide and latch surfaces.

9. The storage device as set forth by claim 1 wherein the "v" notch is formed by converging clip wire guide and latch surfaces leading from a base opening to the apex, the clip wire guide surface being inclined to engage and guide a wrench or similar article onto and off from the clip wire.

10. The storage device as set forth by claim 1;

wherein the latch means is integral with the clip wire;

wherein at least a portion of the clip wire loop is formed in a plane; and wherein the latch means includes "v" guide and latch surfaces forming the notch on the clip wire and latch means in overlapping relation and oriented relative to the plane to inhibit unintentional removal of a wrench or similar article from the clip wire loop.

11. The storage device as set forth by claim 1;

wherein at least a portion of the clip wire loop is formed in a plane adjacent to the latch means; and wherein the latch means includes guide and latch surfaces forming the "v" notch arranged relative to the plane and of a dimension sufficient to receive the thickness dimension of a selected wrench or similar article.

12. The storage device as set forth by claim 1;

wherein at least a portion of the clip wire loop is formed in a plane; and wherein the handle is substantially flat and coplanar with the plane of the clip wire loop.

13. The storage device as set forth by claim 1;

wherein at least a portion of the clip wire loop is formed in a plane;

wherein the handle is substantially flat and coplanar with the plane of the clip wire loop; and wherein the latch means includes guide and latch surfaces forming the "v" notch with the guide and latch surfaces being angled and overlapping one another to inhibit unintentional removal of a wrench or similar article from the clip wire loop.

14. The storage device as set forth by claim 1:

wherein the loop is formed in a plane;

wherein the latch means includes a latch arm pivotably mounted to the clip wire at one end thereof by a pivot pin, for pivotal movement about an axis parallel to the plane of the loop to an open position at approximately 90° from the plane; and wherein the "v" notch is formed by converging guide and latch surfaces leading from a base opening to the apex, the base opening of the "v" notch being of a dimension approximately equal to the width dimension of a selected wrench or similar article.

15. The storage device as set forth by claim 1 the clip wire is formed in a plane at the latch means;

wherein the latch means includes:

a latch arm pivotably mounted to the clip wire at one end thereof by a pivot pin, for pivotal movement in a prescribed direction about an axis to an open position; and wherein the "v" notch is formed by converging guide and latch surfaces, the converging surfaces leading from the opening to an apex offset to one side of the opening such that the guide and latch surfaces overlap one another in relation the plane of the clip wire; and wherein the latch surface of the "v" notch is situated on the latch arm facing away from the prescribed direction of pivotal movement of the latch arm.

16. The storage device as set forth by claim 1 wherein the latch means includes a latch arm pivotably mounted to the clip wire at one end thereof by a pivot pin, for pivotal movement in a prescribed direction about an axis to the open position;

the latch arm including a circular notch formed therein and radially spaced from the axis of the pivot pin;

a compression spring mounted to the clip wire; and a push rod mounted to the compression spring and having an end slidably engaging the circular notch, for urging the latch arm to the closed position; and wherein the "v" notch is formed by converging guide and latch surfaces leading from the opening to the apex, the latch surface of the "v" notch being situated on the latch arm and facing away from the prescribed direction of pivotal movement of the latch arm.

17. The storage device as set forth by claim 1 the clip wire is formed in a plane at the latch means;

wherein the latch means includes:

a latch arm pivotably mounted to the clip wire at one end thereof by a pivot pin, for pivotal movement in a prescribed direction about an axis to an open position;

wherein the "v" notch is formed by converging guide and latch surfaces, the converging surfaces leading from the opening of the "v" notch to the apex which is offset to one side of the base opening such that the guide and latch surfaces overlap one another in relation the plane of the clip wire; and wherein the latch surface of the "v" notch is situated on the latch arm facing away from the prescribed direction of pivotal movement of the latch arm.

18. The storage device as set forth by claim 1 wherein the latch means includes a latch arm pivotably mounted to the clip wire at one end thereof by a pivot pin, for pivotal movement in a prescribed direction about an axis to an open position;

wherein the "v" notch is formed by converging guide and latch surfaces leading from the opening to the apex, the latch surface of the "v" notch being situated on the latch arm facing away from the prescribed direction of pivotal movement of the latch arm; and wherein the latch surface includes a dimension between the apex and opening of the notch sufficient to receive the thickness dimension of a selected wrench or similar article.

19. The storage device as set forth by claim 1 wherein substantially equal lengths of the clip wire extend from opposite sides of the latch means to the handle.

20. The storage device as set forth by claim 1 wherein the clip wire loop includes a substantially straight section and wherein the latch means is located along the straight section.

21. A wrench storage device for releasably supporting a wrench or similar article having an open socket formed at an end, the wrench storage device comprising:

a clip wire extending in a loop configuration from a first clip wire end to a second clip wire end adjacent the first clip wire end;

wherein the clip wire loop is formed substantially in a plane and along an axis adjacent the clip wire ends;

a latch means on the clip wire at the ends thereof and comprised of an inclined latch surface at the first clip wire end and an inclined guide surface at the second clip wire end;

wherein the latch and guide surfaces at the first and second clip wire ends converge angularly from spaced apart base ends to an apex spaced along the axis from the base ends thereby forming an inclined "v" shaped notch into the clip wire and within the cross section thereof, with the spaced apart base ends defining an open base of the "v" shaped notch and the apex spaced along the wire to one side of the open base;

wherein the first and second surfaces, along with the open base end of the "v" shaped notch form an obtuse triangle with the base thereof corresponding to the open base end of the notch;

wherein the first and second surfaces are resiliently separable relative to one another and laterally of the plane of the loop to an open position forming an opening in the loop of sufficient size to facilitate selective threading of the open socket of a wrench or similar article over the clip wire onto or off from the loop.

22. The wrench holder of claim 21 wherein the first and second surfaces are integral with the clip wire.

23. The wrench holder of claim 21 further comprising:

a latch arm;

a pivot pin pivotably mounting the latch arm on the clip wire for pivotal movement to the open position about an axis parallel to the plane of the loop; and wherein the latch surface is formed on the latch arm.

24. The wrench holder of claim 21 wherein the clip wire loop includes a straight section and wherein the clip wire ends are situated along the straight section.

25. A wrench storage device for releasably supporting a wrench or similar article having an open socket formed at an end, the wrench storage device comprising:

a clip wire extending in a loop configuration from a first clip wire end to a second clip wire end adjacent the first clip wire end;

wherein the clip wire loop is formed substantially in a plane adjacent the clip wire ends;

a latch means on the clip wire at the ends thereof and comprised of a latch arm pivotably mounted to the clip wire at one end thereof by a pivot pin, for pivotal movement about an axis parallel to the plane of the loop to an open position at approximately 90° from the plane.

the latch arm including a circular notch formed therein and radially spaced from the axis of the pivot pin;

a compression spring mounted to the clip wire; and a push rod mounted to the compression spring and having an end slidably engaging the circular notch, for urging the latch arm to the closed position.

26. A wrench storage device for releasably supporting a wrench or similar article having an open socket formed at an end along an axis through a thickness dimension, the storage device comprising;

a handle;

a clip wire affixed to the handle and extending in a loop configuration from the handle;

the clip wire including ends spaced adjacent one another along the loop and outward of the handle;

a latch means on the clip wire at the ends thereof responsive to selective forcible engagement by the open socket end of the wrench or similar article to move to an open position forming an opening in the loop and guiding the open socket of the engaged wrench or similar article over the clip wire onto or off from the loop, from a normally closed position wherein the latch means and clip wire are substantially continuous;

wherein at least a portion of the loop formed by the clip wire lies substantially within a plane; and wherein the latch means includes a latch arm pivotably mounted to the clip wire, on an axis that is substantially parallel to the plane.

* * * * *